United States Patent [19]
Madon et al.

[11] Patent Number: 5,395,809
[45] Date of Patent: Mar. 7, 1995

[54] MODIFIED MICROSPHERE FCC CATALYSTS

[75] Inventors: Rostam J. Madon, Flemington; Gerald S. Koermer, Roseland; John M. Macaoay, Linden, all of N.J.

[73] Assignee: Engelhard Corporation, Iselin, N.J.

[21] Appl. No.: 146,639

[22] Filed: Nov. 1, 1993

[51] Int. Cl.$^6$ .......................... B01J 29/28; B01J 37/00
[52] U.S. Cl. .......................... 502/68; 502/65; 502/79
[58] Field of Search .................. 502/68, 65, 79

[56] References Cited

U.S. PATENT DOCUMENTS

| | | | |
|---|---|---|---|
| 3,119,659 | 1/1964 | Taggart et al. | 423/710 |
| 3,367,886 | 2/1968 | Haden, Jr. et al. | 502/68 |
| 3,367,887 | 2/1968 | Haden, Jr. et al. | 502/68 |
| 3,451,948 | 6/1969 | Scott | 502/68 |
| 3,458,454 | 7/1969 | Lapides et al. | 501/68 |
| 3,515,511 | 6/1970 | Flank | 502/68 |
| 3,647,718 | 3/1972 | Haden, Jr. et al. | 502/68 |
| 4,493,902 | 11/1985 | Brown et al. | 502/65 |
| 4,631,262 | 12/1986 | 502 | 65/ |
| 4,631,262 | 12/1986 | Altmare | 502/65 |

*Primary Examiner*—Carl F. Dees
*Attorney, Agent, or Firm*—Inez L. Moselle

[57] ABSTRACT

An in situ process for making improved zeolitic fluid cracking catalyst by spray drying a mixture of hydrous kaolin and spinel, essentially free from metakaolin, calcining the resulting microspheres to convert the hydrous kaolin to metakaolin, and reacting microspheres composed of a mixture of spinel and metakaolin forms of calcined clay with a seeded alkaline sodium silicate solution. The weight percent of hydrous kaolin in the starting (uncalcined) microspheres is greater than the spinel content.

13 Claims, No Drawings

MODIFIED MICROSPHERE FCC CATALYSTS

This invention relates to improvements in zeolitic fluid cracking catalysts (FCC) produced by an in situ reaction between an alkaline sodium silicate solution and microspheres composed of a mixture of two different forms of calcined kaolin clay, so-called "metakaolin" and "spinel". The former is sometimes referred to as "reactive" calcined kaolin and the latter as "kaolin calcined through the characteristic exotherm".

For many years a significant proportion of commercial FCC catalysts used throughout the world have been made by in situ synthesis from precursor microspheres containing kaolin that has been calcined at different severities prior to formation into microspheres by spray drying. Generally, these fluid cracking catalysts are microspheres composed of zeolite Y and matrix material, typically silica alumina. The detailed properties of the matrix can have a profound impact on the properties and performance of a cracking catalyst. This is particularly true for in situ cracking catalysts where the zeolite Y is grown directly on/in the microsphere and is intimately associated with the matrix material. Certain catalysts are made with microspheres which initially contain a hydrous day to spinel weight ratio between 40:60 to 50:50; the microspheres are then calcined at a temperature below the exotherm to convert the hydrous day component to metakaolin. These catalysts will be referred to as type A catalysts. Another type of catalyst is made by spray drying hydrous kaolin microspheres so that the calcined microsphere contains only metakaolin; spinel is not present. These catalysts will be referred to as type B catalysts.

The catalytic properties of these catalysts are influenced by the starting microspheres from which they are made. Type B catalyst has lower coke and dry gas selectivities than type A catalyst, but it is difficult to reduce sodium to low levels and, in the absence of rare earth cations, it is not as stable as Type A catalyst. Type B catalyst also does not have as good a bottoms upgrading capability as Type A catalyst. The latter is more stable and easier to process than Type B catalyst but has a higher dry gas and coke selectivity.

See U.S. Pat. No. 4,493,902 for typical procedures used to make catalysts such as Type A catalysts using raw uncalcined kaolin and spinel as spray dryer feed, followed by calcination to convert the raw kaolin component to metakaolin and subsequent crystallization by reacting the microspheres in a seeded sodium silicate solution. The production of Type B catalysts is similar and involves using only raw uncalcined kaolin as spray dryer feed, whereby calcination of the resulting microspheres results in microspheres in which essentially all of the calcined kaolin is present in metakaolin form.

An objective of this invention is to provide microspheres that result in catalysts that are more stable and easier to process than microspheres used to produce Type B catalysts, yet substantially retain the selectivity benefts of Type B catalysts, while having bottoms upgrading capability similar to Type A catalyst but with lower coke and dry gas selectivities.

SUMMARY OF THE INVENTION

Applicants have found that the proportions of hydrous clay and fully calcined clay contained in the microsphere prior to in situ zeolite growth will significanly affect the properties and performance of the resulting catalyst. Furthermore, the resulting properties and performance attributes such as coke yield, bottoms upgrading, metals resistance, zeolite stability, acitivity and ease of sodium removal. do not vary linearly with the proportions of hydrous clay and fully calcined clay. As a result there is a certain range or window where all or most of the desirable properties and performance attributes are at or near optimal. Applicants have found that the boundaries of this window are defined by the weight ratio of hydrous to fully calcined clay and are approximately 90:10 to 60:40.

Applicants' preferred method for making such catalysts involves initially preparing microspheres composed of combinations of hydrous day and spinel such that the initial hydrous clay content, expressed as weight percent, is greater than the spinel content and the microspheres, at this point of the process, are essentially free from metakaolin. The microspheres also contain a silica binder, usually equal to or greater than 5 wt % of the spray dried particles which is provided by the addition of a sodium silicate solution. The microspheres are calcined at a predetermined temperature to convert the hydrous clay to metakaolin without altering the spinel level. In situ Y zeolite FCC catalysts are then made from these microspheres by Subsequent crystallization in a seeded sodium silicate solution and ion exchanged to reduce sodium level.

Catalysts of this invention are more stable and more active than Type B catalyst. Furthermore, sodium can be removed more easily than with Type B catalyst. Also, catalysts of this invention have low coke and dry gas selectivities similar to those of Type B catalysts. The ease of sodium removal and high activity with concurrent low dry gas and coke yields make these modified microsphere catalysts excellent candidates for high octane catalysts, high isobutylene catalysts and improved (compared to Type B) bottoms upgrading catalysts.

Thus, the combination of spinel and metakaolin in calcined microspheres prior to crystallization, such that the hydrous clay content, wt %, in the starting microsphere is greater than the spinel content, leads to a more stable, more active catalyst, with greater ease of $Na_2O$ removal than with calcined microspheres containing metakaolin alone. Depending on the combination of hydrous kaolin and metakaolin, the catalysts that are produced can mimic the beneficial properties of Type B and Type A catalysts and improve on the deficiencies of these two catalysts.

DETAILED DESCRIPTION

Catalysts of the invention are made from precursor porous microspheres composed of calcined kaolin of which a major weight portion is metakaolin and a minor weight proportion of spinel and a sodium silicate binder. The precursor microspheres are reacted with seeds and an alkaline sodium silicate solution. The microspheres are crystallized to a desired zeolite content (typically ca. 55–65%), filtered, washed, ammonium exchanged, exchanged with rare-earth cations if required, calcined, exchanged a second time with ammonium ions, and calcined a second time if required.

Especially preferred compositions of the solids in the slurry which is spray dried to form porous microspheres that are calcined to prepare precursor microspheres are expressed as the weight percent of hydrated kaolin, metakaolin, and kaolin calcined through the exotherm on a binder-free basis; weight % $SiO_2$ binder is based on the total weight of dry microspheres and provided by a sodium silicate solution.

|  | Especially preferred | Preferred |
|---|---|---|
| Hydrated Kaolin | 70–80 | 60–90 |
| Metakaolin | 0 | 0 |
| Kaolin calcined through the exotherm | 30–20 | 40–10 |
| Sodium Silicate Binder (as SiO$_2$) | 5–17 | 2–25 |

A commercial source of powdered kaolin calcined through the exotherm, e.g., SATINTONE® No. 1 calcined kaolin, may be used in the preferred process for forming the spray dried microspheres composed of kaolin calcined through its exotherm and hydrous kaolin. Preferably, large, coarse hydrated kaolin clay, such as NOKARB® kaolin, is converted to this state by calcining the kaolin at least substantially completely through its characteristic exotherm. (The exotherm is detectable by conventional differential thermal analysis, DTA.) For example, a one inch bed of hydrated kaolin clay may be calcined for about 1–2 hours in a muffle furnace at a chamber temperature of about 1800°–1900° F. to produce day that has been calcined through its characteristic exotherm, preferably without any substantial formation of mullite. During calcination, some of the finely divided day agglomerates into larger particles. After completion of calcination, the agglomerated calcined clay is pulverized into finely divided particles before being introduced into the slurry that is fed to the spray dryer.

The hydrated kaolin day component of the especially preferred feed slurry can be suitably either be one or a mixture of ASP® 600 or ASP® 400 kaolin. Preferably, all the clay, hydrated and calcined, is a low iron content, purified grade of clay. Purified water-processed kaolin clays from Middle Georgia have been used with success. Silicate for the binder is preferably provided by sodium silicates with SiO$_2$ to Na$_2$O ratios of from 1.5 to 3.5 and especially preferred ratios of from 2.0 to 3.0.

In a preferred embodiment of the invention an aqueous slurry of finely divided hydrated kaolin day, and clay that has been calcined through its characteristic exotherm and sodium silicate binder is prepared. The aqueous slurry is then spray dried to obtain microspheres comprising a sodium silicate bonded mixture of hydrated clay and clay that has been calcined at least substantially through its characteristic exotherm. The microspheres have average particle diameters that are typical of commercial fluid catalytic cracking catalysts, e.g., 65–85 microns. Suitable spray drying conditions are set forth in the '902 patent.

After spray drying, the microspheres are calcined at a temperature and for a time (e.g., for two hours in a muffle furnace at a chamber temperature of about 1350° F.) sufficient to convert the hydrated clay component of the microspheres to metakaolin, leaving the previously calcined clay components of the microspheres essentially unchanged. The resulting calcined porous microspheres comprise a mixture of metakaolin and kaolin clay calcined through its characteristic exotherm in which the two types of calcined clay are present in the same microspheres. Most preferably the calcined microspheres comprise about 43 to 82 % by weight metakaolin and about 33 to 10% by weight kaolin clay that has been calcined through its characteristic exotherm. The balance is Na$_2$O and SiO$_2$ derived from sodium silicate. The calcined microspheres may include small amounts of mullite (which can be detected by X-ray analysis).

"Silica Retention" is advantageously practiced. The teachings of U.S. Pat. No. 4,493,902 at col. 12, 1.3–31, regarding silica retention are incorporated herein by cross-reference.

After crystallization, the microspheres contain crystalline Y-faujasite in the sodium form. In order to obtain a product having acceptable catalytic properties, it is necessary to replace sodium cations in the microspheres with more desirable cations. This may be accomplished by contacting the microspheres with solutions containing ammonium or rare earth cations or both. The ion exchange step or steps are preferably carried out so that the resulting catalyst contains less than about 0.7%, most preferably less than about 0.5% and most preferably less than about 0.4%, by weight Na$_2$O. After ion exchange, the microspheres are dried, preferably by flash drying, to obtain the microspheres of the present invention. In order to make 0 wt % rare earth (REO) catalysts, the Na$^+$ cations are exchanged by using only an ammonium salt such as NH$_4$NO$_3$ and without using any rare earth salt during exchange. Such 0 wt % REO catalysts are especially beneficial as FCC catalysts that give higher octane gasoline and more olefinic product. Rare earth versions of catalysts of this invention, post treated after crystallization by ion-exchange with high levels of rare earth, e.g., by procedures such as described in the '902 patent, are useful when exceptionally high activity is sought and the octane rating of the FCC gasoline produce is not of prime importance. Rare earth levels in the range of 0.1% to 12% usually between 0.5% and 7% (weight basis) are contemplated.

The preferred catalyst of the invention comprises microspheres containing at least 40% and preferably from 50 to 65% by weight Y-faujasite, expressed on the basis of the ascrystallized sodium faujasite form zeolite. As used herein, the term Y-faujasite shall include synthetic faujasite zeolites exhibiting, in the sodium form, an X-ray diffraction pattern of the type described in Breck, Zeolite Molecular Sieves, p. 369, Table 4.90 (1974), and having a crystalline unit cell size, in the sodium form (after washing any crystallization mother liquor from the zeolite), of less than about 24.75 A as determined by the technique described in the ASTM standard method of testing titled "Determination of the Unit Cell Size Dimension of a Faujasite Type Zeolite" (Designation D3942-80) or by an equivalent technique. The term Y-faujasite shall encompass the zeolite in its sodium form as well as in the known modified forms, including, e.g., rare earth and ammonium exchanged forms and stabilized forms. The percentage of Y-faujasite zeolite in the microspheres of the catalyst is determined when the zeolite is in the sodium form (after it has been washed to remove any crystallization mother liquor contained within the microspheres) by the technique described in the ASTM standard method of testing titled "Relative Zeolite Diffraction Intensities" (Designation D3906-80) or by an equivalent technique. It is important to equilibrate the microspheres carefully before X-ray evaluations are made since equilibration can have a significant effect on the results.

It is preferred that the Y-faujasite component of the microspheres, in their sodium form, have a crystalline unit cell size of less than about 24.73 A and most preferably less than about 24.69 A. Typically, the Y-faujasite component of the microspheres has a crystalline unit cell size range of between 24.64–24.73 A, corresponding to a $SiO_2/Al_2O_3$ molar ratio of the Y-faujasite of about 4.1–5.2.

The resulting catalyst after the first calcination should have a BET surface area of at least about 450 $m^2/g$, preferably over 475 $m^2/g$, and most preferably in the range of from about 475 $m^2/g$ to about 550 $m^2/g$. The matrix surface areas should preferably be in the range 40 to 130 $m^2/g$, and most preferably in the range of from about 60 $m^2/g$ to about 110 $m^2/g$.

Conditions useful in operating FCC units utilizing catalyst of the invention are well known in the art and are contemplated in using the catalysts of the invention. These conditions are described in numerous publications including Catal. Rev. - Sci. Eng., 18 (1), 1–150 (1978), which is incorporated herein by cross-reference.

The following tests were used in the accompanying illustrative examples.

MAT (microactivity test) is described in U.S. Pat. No. 4,493,902. Steaming conditions prior to testing are also described in U.S. Pat. No. 4,493,902. The gas oil used in some of the tests described in this application was CTSGO 175. The properties of this gas oil are set forth in U.S. Pat. No. 5,023,220. Two other heavier gas oils CTSGO 3241 and CTSGO 2255 were also used to test the catalysts. All conversions reported herein are expressed on a weight basis.

CTSGO 3241

API @ 60° F.=19.7; Conradson carbon=0.57; Pour point=97° F.; Aniline point=163.5° F. Basic nitrogen=420 ppm; Total nitrogen=1320 ppm; Sulfur=2.21 wt %; Na=1.1 ppm; Ni, V, Fe, Cu all 0.1 ppm or less.

| Distillation, °F. | |
|---|---|
| Initial boiling pt. | 538 |
| 5% off | 658 |
| 10% off | 698 |
| 40% off | 808 |
| 60% off | 864 |
| 80% off | 929 |
| 90% off | 975 |
| 95% off | 1011 |
| Final boiling pt. | 1011 |

CTSGO 2255

API @60° F.=24.2; Conradson carbon=0.50; Pour point=88° F.; Aniline point=166° F. Basic nitrogen=327 ppm; Total nitrogen=1152 ppm; Sulfur=2.1 wt %; Na=1.7 ppm; Ni=0.7 ppm, V=2.7 ppm, Fe=0.6 ppm, Cu=0.1 ppm.

| Distillation, °F. | |
|---|---|
| Initial boiling pt. | 394 |
| 5% off | 497 |
| 10% off | 556 |
| 40% off | 713 |
| 60% off | 785 |
| 80% off | 886 |
| 90% off | 997 |
| Final boiling pt. | 997 |

The acid solubility test described in U.S. Pat. No. 5,023,220 can be used for the determination of the total acid solubility of calcined microspheres composed of metakaolin or of mixtures of fully calcined kaolin and metakaolin. The acid solubility is an indication of the relative amount of metakaolin in mixtures containing metakaloin and spinel because metakaloin has appreciable solubility in acid but spinel does not. The total acid solubility range for the calcined microspheres used to make catalysts of this invention range between about 23 and 37%. In carrying out the test, a one (1) gram of sample is leached with 50% HCl, the residue filtered ignited at 1000° C. and weighed. The percent acid solubility is calculated from the weight loss. A loss on ignition is obtained to correct for volatile constituents.

A modification of ASTM Standard Test Method D-4365-85 was used for determining that portion of the total area of the catalyst ascribable to micropores, which may be interpreted in terms of percent zeolite and is called "zeolite area". Relative pressures (P/Po) of 0.08, 0.11, 0.14, 0.17 and 0.20 were used for collecting the data, which was used to calculate the BET-area (total surface area) and the t-area (matrix surface area) by the DeBoer t-plot method. The method used differed from the ASTM method in that lower relative pressure points were not used if a negative intercept was obtained (paragraph 10.13.1) and the formula for calculating the t-area did not include the factor 0.975 (paragraph 11.14 and 11.14.1).

The FCC circulating pilot unit (used in Example 4) is a small scale fluid catalytic cracking unit operating at atmospheric pressure. It features a vertical lean phase riser reactor, a stripper that disengages the oil products from the catalyst, and a catalyst regenerator. The unit charges 2500 grams of catalyst and runs at a 7–15 gm/min oil rate.

The riser operates under a pseudo—adiabatic condition and uses nitrogen for dispersion of catalyst and oil. Catalyst evaluations are conducted by running 2 to 4 hour material balance runs. After products are disengaged from the catalyst in the stripper, the gas products are separated from the heavier condensate. The gas products are analyzed by online gas chromatography, while the condensed products are stored, weighed and analyzed in a simulation distillation gas chromatography (ASTM D2887). A packed column distillation (ASTM 2892) with 5:1 reflux is also used to separate products into various boiling point cuts.

EXAMPLES

In the accompanying illustrative examples, separate sets of starting spray dried microspheres were prepared using different proportions of hydrous kaolin to spinel. The weight ratios of hydrous day to spinel were 90:10, 80:20, 70:30, 60:40 and 55:45 (prior to calcination and crystallization). Binder levels for these catalysts were 5% as $SiO_2$. Catalysts are referred to by their starting microsphere content; catalyst "7030" means one which has a starting hydrous day to spinel weight ratio of 70:30. As examples, the "8020" catalyst was made from microspheres containing 374 g spinel, 1498 g ASP 600 hydrous kaolin clay, and 345 g N ® brand sodium silicate solution; the 7030 catalyst was made from microspheres containing 562 g spinel, 1311 g ASP 600 hydrous kaolin day, and 345 g N ® brand sodium silicate solution; the 6040 catalyst was made from microspheres containing 749 g spinel, 1123 g ASP 600 hydrous kaolin clay, and 345 g N brand sodium silicate solution. The microspheres described here and used to make catalysts used in Examples 1 and 2 contain 5 wt % binder as $SiO_2$. The zeolite was grown in situ using these microspheres with seeds, N brand sodium silicate, NaOH, and water, substantially as described in U.S. Pat. No. 4,493,902.

The preparation of seeds used in the tests is described in U.S. Pat. No. 4,631,261, the teachings of which are incorporated herein by cross-reference. Approximately 55 to 65 wt % Y zeolite (as determined by x-ray) was obtained in each of the cases. An example is given below:

The following amounts of components and weight ratios were used to make the 7030 catalyst:
Microspheres (7030)—600 g
Seeds—464.2 g
N ® Brand Sodium Silicate Solution—2102.7 g
NaOH (50%)—303.2 g
Water—370.7 g
$SiO_2/Na_2O$—2.73
$H_2O/Na_2O$—5.6977
$SiO_2/Al_2O_3$—5.9700

Components were added to a 1 liter reaction kettle in the following order: N Brand sodium silicate, seeds, caustic, water, and microspheres. These were then agitated and heated to 210° F. and maintained there until sufficient zeolite was grown.

EXAMPLE 1

Catalysts 7030 and 8020 (Table 1) were base exchanged using a series of exchanges consisting of mixing the catalyst in a water/ammonium nitrate solution, adjusting the pH to 3.0–3.5 with 1:1 nitric acid, heating the slurry to 180° F., maintaining this temperature for 15 minutes, filtering on a Buchner funnel and rinsing the filter cake with deionized water comparable to 2 times the VF weight of catalyst. Amounts for the first initial exchanges on a 1 VFg catalyst basis were:
1. 1.5 g 54% ammonium nitrate, 0.5 g $H_2O$
2. 0.5 g 54% ammonium nitrate, 1.75 g $H_2O$ This material was then calcined at 1150° F., followed by a second series of 4 exchanges using 1.0 g 54% ammonium nitrate and 1.0 g $H_2O$ per 1 VFg catalyst. The base exchanged catalyst was calcined for the second time at 1000° F. to facilitate further ion exchange and three exchanges of 1.0 g 54% ammonium nitrate, 1.0 $H_2O$ per 1 VFg catalyst were performed. The $Na_2O$ levels decreased to 0.12 to 0.18 wt % after this treatment. These catalysts contained no rare earth cations. In contrast, the $Na_2O$ level on Type B catalyst with 0 wt % REO after the second calcination and standard exchanges cannot be brought below about 0.4 wt %. Processing of 0 wt % REO Type B catalyst to get low $Na_2O$ levels, leads to instability and loss in surface area.

Applicants explain this significant decease in sodium after the second calcination as follows. During high temperature calcination there is sufficient thermal energy to enable sodium containing species to surface diffuse. If only metakaolin is present, the species readsorb on sites from which they are difficult to remove during base exchange. However, when spinel is present, different sites are now available during surface diffusion for the sodium species to readsorb on; these species on spinel sites are then readily removed. Spinel thus acts as a porthole for sodium removal.

Catalysts 8020 and 7030 with the low $Na_2O$ levels were steamed at 1450° F. for 4 hours. The catalysts are compared in Table 1 with 0 wt % REO Type B steamed at the same conditions. Data in Table I shows that the modified microsphere catalysts have higher Y zeolite surface areas. They are more active, at the conditions studied, as noted from the blend ratio required to give 71–72% conversion. Product yields are very similar to Type B catalyst. The MAT work was done with light CTSGO 175 gas oil.

EXAMPLE 2

In Table 2, catalyst 7030 with 1.2 wt % REO is compared to Type B and Type A catalysts. The catalyst was made as in Example 1 except just before the first calcination the catalyst was exchanged with rare earth nitrate solution to get a 1.2 wt % REO catalyst. The 7030 catalyst used in this example was not calcined a second time. Catalysts were all steamed at 1450° F. for 4 hours in 100% steam. In the presence of REO, $Na_2O$ was brought down to 0.32 wt % after only one calcination for the 7030 catalyst. Two calcinations are required to get to the 0.3 wt % $Na_2O$ level for Type B. The Roller Attrition Index of the 7030 catalyst was 6.7, indicating a material whose hardness is compatible with refinery needs. The 7030 catalyst was significantly more active than Type B catalyst as seen from the blend ratio with inerts needed to get 70% conversion. The 7030 catalyst had the same dry gas yields as Type B catalyst but lower than with Type A catalyst. Also, coke yields with 7030 were closer to those obtained with Type B catalyst and are lower than with Type A catalyst. Standard MAT conditions were used as with Example 1; light gas oil CTSGO 175 was used.

EXAMPLE 3

7030 microspheres were made containing a clay composition of 70% ASP 600 hydrous kaolin clay and 30% spinel. The binder level of the microsphere was 14.1 wt % as $SiO_2$. The binder used was #14 silicate; $SiO_2/Na_2O$=2.88. The microspheres were calcined at 1500° F. for 1 hour to transform all the hydrous to metakaolin. The zeolite was grown in situ using these microspheres with seeds, N-brand sodium silicate, NaOH, and water, substantially as described in U.S. Pat. No. 4,493,902.

The following amounts of components and weight ratios were used to make the 7030 catalyst:
Microspheres (7030)—100 g
Seeds—68.97 g
N Brand—247.7 g
Caustic (50%)—34.7 g
Water—83.96 g
$SiO_2/Na_2O$—2.86
$H_2O/Na_2O$—6.00
$SiO_2/Al_2O_3$—5.8

Components were added to a 1 liter ireaction kettle in the following order: N Brand sodium silicate solution, seeds, caustic, water, and microspheres. These were then agitated and heated to 210° F. and maintained there until sufficient zeolite was grown. The 7030 catalyst was base exchanged using a series of exchanges consisting of mixing the catalyst in a water/ammonium nitrate solution, adjusting the pH to 3.0–3.5 with 1:1 nitric acid, heating the slurry to 180° F., maintaining this temperature for 15 minutes, filtering on a Buchner funnel and rinsing the filter cake with deionized water comparable to two times the VF weight of catalyst. Amounts for the first initial exchanges on a 1 VFg catalyst basis were:
1. 1.5 g 54% ammonium nitrate, 0.5 g $H_2O$
2. 0.5 g 54% ammonium nitrate, 1.75 g $H_2O$ Rare earth was then exchanged onto the catalyst using a nitrate salt to give a final REO value of 1.0 wt %. The rare earth was a commerical mixture composed primarily of lanthanum and cerium. This material was then calcined at 1150° F., followed by a second series of exchanges using 1.0 g 54% ammonium nitrate and 1.0 g H₂O per 1 VFg catalyst each time. The base exchanged catalyst was calcined for the second time at 1150° F.

Table 3 shows the characteristics of the catalyst and the comparison using MAT with rare earth containing Type A and Type B catalysts. All catalysts were steamed at 1450° F. for 4 h. A heavy gas oil CTSGO 2252 was used for the tests. MATs were run for each catalyst at several catalyst/oil ratios to vary conversion. Results in Table 3 are statistically correlated at 70% conversion. Even with the heavier gas oil the 7030 catalyst gives lower coke yield than Type A or Type B catalyst.

EXAMPLE 4

7030 microspheres were made containing a clay composition of 70% ASP 600 hydrous kaolin clay and 30% spinel. The binder level of the microsphere was 14.1 wt % as SiO₂. The binder used was #14 silicate. The microspheres were calcined at 1500° F. for 1 h to transform all the hydrous clay to metakaolin.

The following amounts of components and weight ratios were used to make the 7030 catalyst:

Microspheres (7030)—17.607 kg
Seeds—14.014 kg
N-Brand—42.488 kg
Caustic (50%)—5.557 kg
Water—14.449 kg
SiO₂/Na₂O—2.88
H₂O/Na₂O—6.00
SiO₂/Al₂O₃—5.8

The seeds used contained 38.1% solids, 21.8% SiO₂, 0.49% Al₂O₃ and 13.5% Na₂O; the N Brand contained 29.0% SiO₂ and 8.98% Na₂O.

All components except microspheres were added to a 25 gallon pilot plant reactor, and stirred for about 30 mins. Microspheres were then added and the starting temperature was about 95° F. The mix was stirred continuously and the temperature was raised to 210° F. in about 25 min. The reactor was held at temperature for 20 hours at which point about 60 wt % NaY zeolite was formed. This value was obtained via standard X-ray diffraction. Reactor was then emptied manually into pan filters, washed with about 10 gallons of hot (180° F.) deionized water followed by cold deionized water. Filter cake was then placed in four large pans and dried in an oven set at 230° F. for approximately 18 hours. The dried sample was screened to retain −60 mesh material. It had a total surface area of 515 m²/g and matrix surface area of 48 m²/g, and a unit cell size of 24.66 A.

The dried catalyst, 24.62 kg, was base exchanged using 33.237 kg of 54% ammonium nitrate solution and 16 kg of deionized water at 180° F. in a stirred 25 gallon vessel. The pH was adjusted to 3.0. Catalyst was added in small quantities while adjusting the pH with concentrated nitric acid; pH was not allowed to exceed 4.0. After all catalyst addition was complete the mix was allowed to react for 15 min. The catalyst was then filtered on pan filters and washed with cold deionized water. A similar second base exchange was carried out again. But this time only 16.0 kg of 54% ammonium nitrate solution and 33.237 kg of deionized water were used. The pH during catalyst addition was held between 3.0 and 3.3; final pH during exchange remained at 3.13. After filtering and washing, the filter cake was dried overnight at 230° F. The catalyst at this point contained 3.67 wt % Na₂O, and the LOI (loss on ignition) corresponded to 25.4 wt %.

The dried material was calcined after making sure that the moisture content of the sample was 25 wt %. Calcination was performed on flat trays in a furnace at 1150° F. for 2 hours. The total surface area of the calcined catalyst was 442 m²/g and the matrix surface area was 95 m²/g. The unit cell size was 24.68 A.

Base exchange was carried out on the calcined catalyst again using the large 25 gallon vessel; 18.2 kg ammonium nitrate and 18.2 kg deionized water were used, the temperature was 180° F. and the pH was kept between 3.0 and 3.3. The material was exchanged for 15 minutes then filtered and washed with cold water. This exchange process was repeated six more times. The material was then oven dried at 250° F. Analysis at this stage showed the Na₂O content to be 0.47 wt % and the LOI to be 17.4 wt %. The total surface area of the catalyst was 407 m2/ g and the matrix surface area was 82 m₂/g. The unit cell size was 24.57 A.

The dried base exchanged material was calcined after making sure that the moisture content of the sample was 25 wt % to assure that the zeolite would undergo "ultrastabilization" during the calcination. Calcination was done on flat trays in a furnace at 150° F. for 2 hours. The total surface area of the calcined catalyst was 376 m²/g and the matrix surface area was 97 m²/g, while the unit cell size was 24.41 A.

A blend of 90 wt % catalyst and 10 wt % inerts was made using 2700 g of the above described 7030 catalyst with 300 g of inerts. This blend was subjected to steam treatment. The blend. was placed in a fluid bed steamer at room temperature and a 1368 cc/min nitrogen flow. Temperature was increased to 1400° F. at which point steam was introduced, and the N₂ flow was cut back so that the steam amount was 90 vol %. The final temperature was 1450° F. The blend was steamed for 8 hours and then the temperature was cut and steam was simultaneously shut down. The catalyst was cooled to room temperature in flowing N₂. A Type A catalyst blend containing 76% catalyst and 24% inerts was similarly steamed for 9 hours.

The 7030 catalyst and the Type A catalyst were tested using the heavy CTSGO 3241 gas oil in a pilot unit. The pilot unit was used instead of the standard MAT unit to study bottoms upgrading capability. The following temperatures were used: regenerator=1225° F., regenerator crossover=1049° F., riser bottom=956° F., oil inlet=272° F., log mean temperature of riser=977° F., stripper=948° F., spent catalyst=402° F., feed preheat=300° F. Regenerator air flow was 9.26 l/min; and the regenerator N² flow was 3.52 l/min. The oil feed rate was 9.79 g/min and the oil residence time in the riser was 2.3 s. Catalysts were studied at different catalyst/oil ratios which were obtained by varying the catalyst circulation rate. The results in Table 4 are statistically correlated to give values at 70% conversion. It was noted that with the heavy oil used the coke yields are lower with the 7030 catalyst without negatively affecting similar gasoline or bottoms yields.

TABLE 1

Comparison of 8020 and 7030 with Type B Catalyst
Using a Light Gas Oil
Standard MAT conditions used; 910° F., 5 catalyst/oil ratio, 1.2 g oil delivered in 48 s; gas oil used = CTSGO 175;
The catalysts were all substantially free from REO

| Catalyst | 8020 | 7030 | Type B Set 1 | Type B Set 2 |
|---|---|---|---|---|
| Na₂O, wt % | 0.18 | 0.12 | 0.43 | 0.43 |

TABLE 1-continued

Comparison of 8020 and 7030 with Type B Catalyst
Using a Light Gas Oil
Standard MAT conditions used; 910° F., 5 catalyst/oil ratio, 1.2 g
oil delivered in 48 s; gas oil used = CTSGO 175;
The catalysts were all substantially free from REO

| Catalyst | 8020 | 7030 | Type B Set 1 | Type B Set 2 |
|---|---|---|---|---|
| $SiO_2$, wt % | 66.6 | 64.6 | 68.0 | 68.0 |
| $Al_2O_3$, wt % | 30.9 | 32.4 | 28.0 | 28.0 |
| Surface areas | | | | |
| Total, $m^2/g$ | 254 | 259 | 232 | 232 |
| Matrix, $m^2/g$ | 74 | 78 | 62 | 62 |
| Blend; cat/inert | 80/20 | 80/20 | 100/0 | 100/0 |
| Conversion, wt % | 71 | 72 | 71 | 72 |
| Yields, wt % | | | | |
| Hydrogen | 0.04 | 0.04 | 0.04 | 0.35 |
| Total dry gas | 1.23 | 1.21 | 1.24 | 1.22 |
| LPG | 14.9 | 15.7 | 14.5 | 15.2 |
| Gasoline | 50.8 | 50.9 | 51.2 | 51.9 |
| Coke | 3.74 | 3.73 | 3.63 | 3.74 |

TABLE 2

Comparison of Rare Earth Containing 7030 Catalyst with
Type A and Type B Catalysts Using Light CRSGO 175 Gas Oil.
MAT conditions as given in Example 1.

| Catalyst | 7030 | Type B | Type A |
|---|---|---|---|
| $Na_2O$, wt % | 0.32 | 0.3 | 0.25 |
| $SiO_2$, wt % | 63.3 | 65.4 | 54.3 |
| $Al_2O_3$, wt % | 32.5 | 30.1 | 40.6 |
| REO, wt % | 1.2 | 1.1 | 1.0 |
| Surface areas | | | |
| Total, $m^2/g$ | 294 | 230 | 321 |
| Matrix, $m^2/g$ | 92 | 64 | 128 |
| Blend; cat/inert | 51/49 | 70/30 | 60/40 |
| Conversion, wt % | 70.1 | 70.9 | 71.8 |
| Yields, wt % | | | |
| Hydrogen | 0.03 | 0.03 | 0.05 |
| Total dry gas | 0.99 | 1.00 | 1.25 |
| LPG | 13.4 | 13.7 | 14.0 |
| Gasoline | 52.4 | 53.1 | 52.5 |
| Coke | 3.13 | 2.86 | 3.86 |

TABLE 3

Comparison of Rare Earth Containing 7030 Catalyst with Type A
and Type B Catalysts Using Heavy CTSGO 2255 Gas Oil.

| Catalyst | 7030 | Type B | Type A |
|---|---|---|---|
| $Na_2O$, wt % | 0.26 | 0.29 | 0.27 |
| $SiO_2$, wt % | 62.4 | 68.0 | 56.1 |
| $Al_2O_3$, wt % | 33.2 | 27.7 | 41.0 |
| REO, wt % | 1.0 | 1.1 | 1.0 |
| Surface areas | | | |
| Total, $m^2/g$ | 329 | 294 | 330 |
| Matrix, $m^2/g$ | 93 | 79 | 126 |
| Blend; cat/inert | 70/30 | 75/25 | 70/30 |
| Yields, wt % | | | |
| Total dry gas | 2.3 | 2.3 | 2.2 |
| LPG | 15.1 | 14.8 | 14.2 |
| Gasoline | 46.8 | 46.8 | 46.8 |
| Coke | 5.8 | 6.1 | 6.8 |

TABLE 4

Comparison of a 7030 Catalyst with Type A Catalyst, Both
Containing No Rare Earth Cations, Using Heavy CTSGO 3241
Gas Oil in a Pilot Unit.
Yields at 70 wt % conversion.

| Catalyst | 7030 | Type A |
|---|---|---|
| $Na_2O$, wt % | 0.41 | 0.26 |
| $SiO_2$, wt % | 64.3 | 55.8 |
| $Al_2O_3$, wt % | 33.2 | 39.6 |
| Surface areas | | |
| Total, $m^2/g$ | 277 | 294 |
| Matrix, $m^2/g$ | 75 | 130 |
| Blend; cat/inert | 90/10 | 76/24 |
| Yields, wt % | | |
| Hydrogen | 0.04 | 0.05 |
| Total Dry Gas | 1.5 | 1.6 |
| LPG | 15.7 | 13.5 |
| Gasoline | 47.7 | 48.1 |
| Coke | 5.1 | 6.8 |
| LCO | 15.3 | 15.2 |
| Bottoms | 14.7 | 14.8 |

We claim:

1. A zeolitic fluid catalytic cracking catalyst having reduced coke yield and produced by the steps comprising:
   (a) forming an aqueous slurry containing about 60 to 90 parts by weight hydrated kaolin day and about 40 to 10 parts by weight kaolin day that has been calcined through its characteristic exotherm, and binder;
   (b) spray drying the aqueous slurry to obtain microspheres;
   (c) calcining the microspheres obtained in step (b) at a temperature and for a time sufficient to convert the hydrated kaolin day in the microspheres substantially to metakaolin, but insufficient to cause metakaolin or hydrated kaolin to undergo the characteristic kaolin exotherm and to provide microspheres of calcined day having a ratio of metakaolin to clay calcined through the exotherm in excess of 1:1;
   (d) mixing the microspheres obtained in step (c) with sodium silicate and water to obtain an alkaline slurry;
   (e) heating the slurry of microspheres of calcined clay to a temperature and for a time sufficient to crystallize at least about 40% by weight Y-faujasite in the microspheres, said Y-faujasite being in the sodium form;
   (f) and ion-exchanging the microspheres from step (e) with an ammonium salt solution.

2. The catalyst of claim 1 wherein said slurry in step (a) is substantially free from rectakaolin.

3. The catalyst of claim 1 wherein the clay that has been calcined at least substantially through its characteristic exotherm contains substantially no mullite.

4. The catalyst of claim 1 wherein the kaolin calcined through the exotherm is present in amount in the range of about 35 to 20 parts by weight to about 65 to 80 parts by weight hydrated kaolin clay in step (a).

5. The catalyst of claim 1 in which said binder is a sodium silicate solution.

6. The catalyst of claim 5 in which the binder level as $SiO_2$ is between about 2 to 25 wt % of the microspheres in step (a).

7. The catalyst of claim 5 in which the binder level as $SiO_2$ is between about 4 to 17 wt % of the microspheres in step (a).

8. The method for making a high zeolite content fluid catalytic cracking catalyst comprising the steps of (a) forming an aqueous slurry containing about 90 to 60 parts by weight hydrated kaolin clay and about 10 to 40 parts by weight kaolin clay that has been calcined through its characteristic exotherm, and sodium silicate binder, said slurry being substantially free from metakaolin;

(b) spray drying the aqueous slurry to obtain microspheres;

(e) calcining the microspheres obtained in step (b) at a temperature and for a time sufficient to convert the hydrated kaolin clay in the microspheres substantially to metakaolin, but insufficient to cause metakaolin or hydrated kaolin to undergo the characteristic kaolin exotherm and to provide microspheres of calcined day having total acid solubility between about 23 and 37%;

(d) mixing the microspheres obtained in step (c) with sodium silicate, sodium hydroxide and water to obtain an alkaline slurry;

(e) heating the slurry of microspheres of calcined clay to a temperature and for a time sufficient to crystallize at least about 40% by weight Y-faujasite in the microspheres, said Y-faujasite being in the sodium form.

9. The method of claim 8 wherein from 50 to 65% by weight Y-faujasite is crystallized in the microspheres in step (e).

10. The method of claim 8 including the steps of:
(f) separating the microspheres containing at least 40% by weight Y-faujasite from at least a major portion of its mother liquor;
(g) replacing sodium cations in the microspheres separated in step (e) with ammonium ions or ammonium ions and therafter rare earth ions;
(h) calcining the microspheres from step (a) to facilitate release of sodium ions;
(i) further exchanging the microspheres with ammonium ions to reduce $Na_2O$ content to below 1% and
(j) further calcining the microspheres to reduce the unit cell size of the zeolite.

11. The process of claim 10 in which the rare earth content expressed as rare earth oxide, REO, is between 0.1 wt % and 12 wt %.

12. The process of claim 10 in which the rare earth content expressed as rare earth oxide, REO, is between 0.5 wt % and 7 wt %.

13. The process of claim 10 in which the sodium content expressed as $Na_2O$ is between 0.05 and 1.0 wt %.

* * * * *